INVENTORS
JOHN R. FORD,
LESLIE E. MATSON JR.
& WALTER W. WEINSTOCK

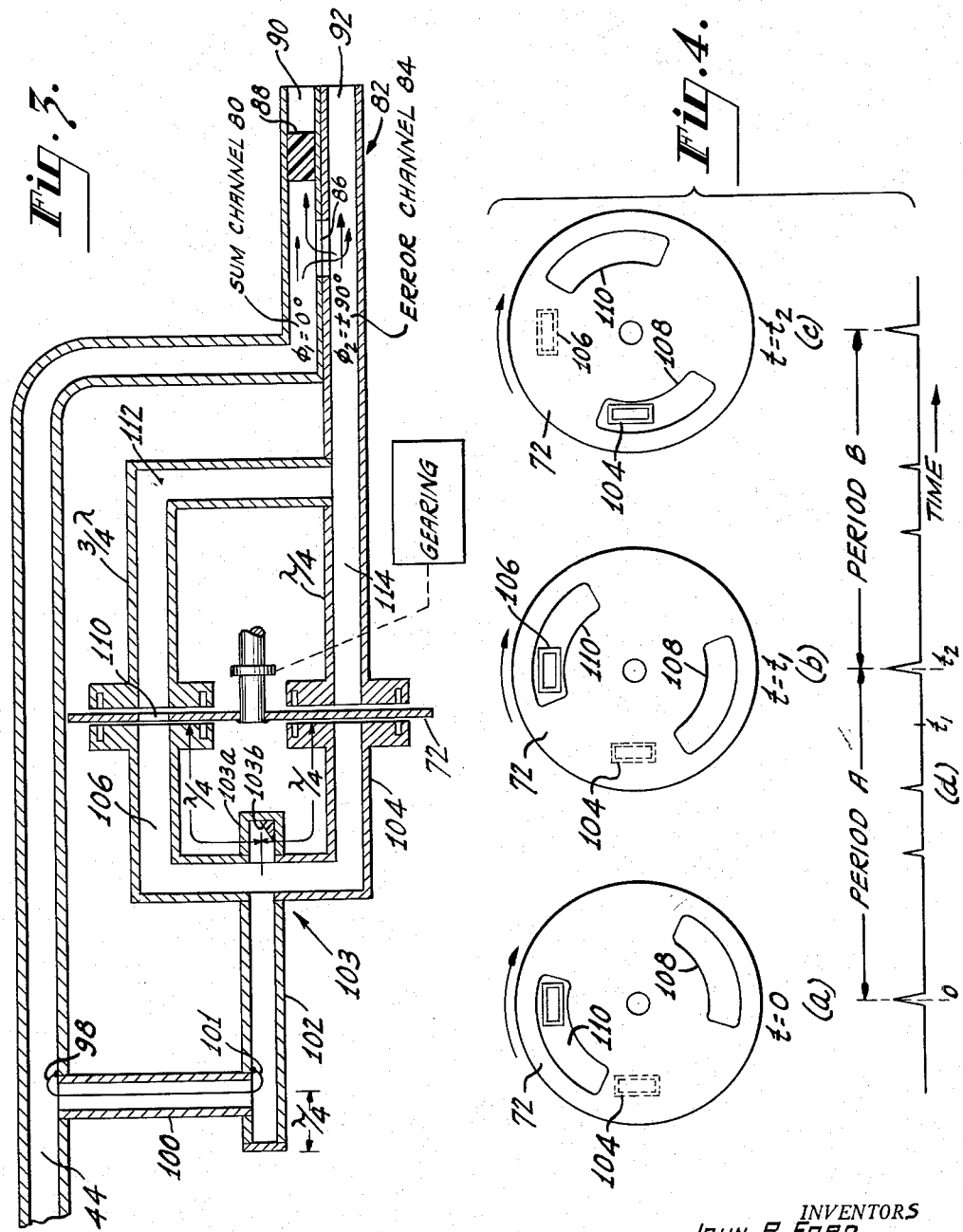

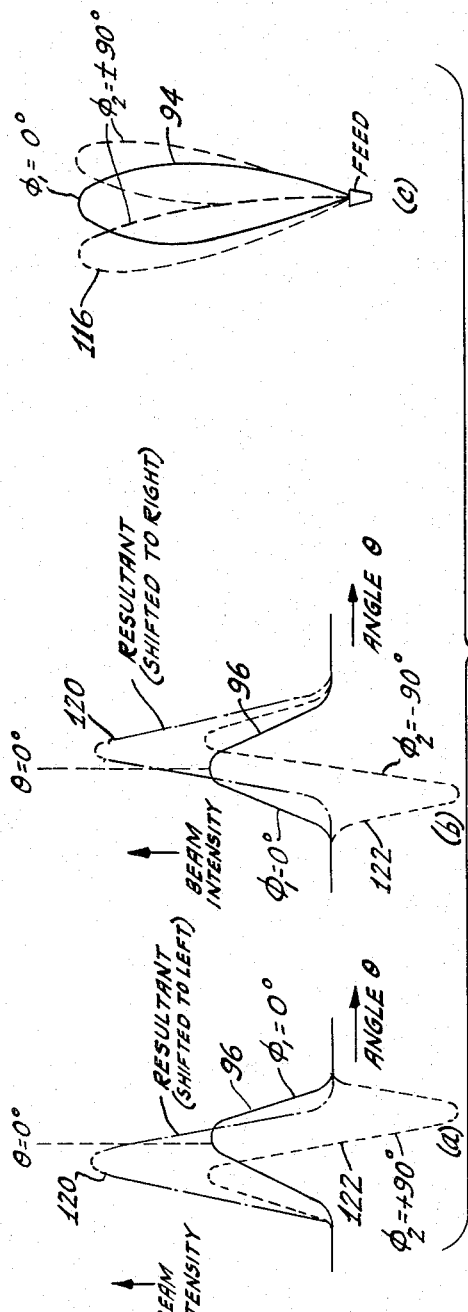
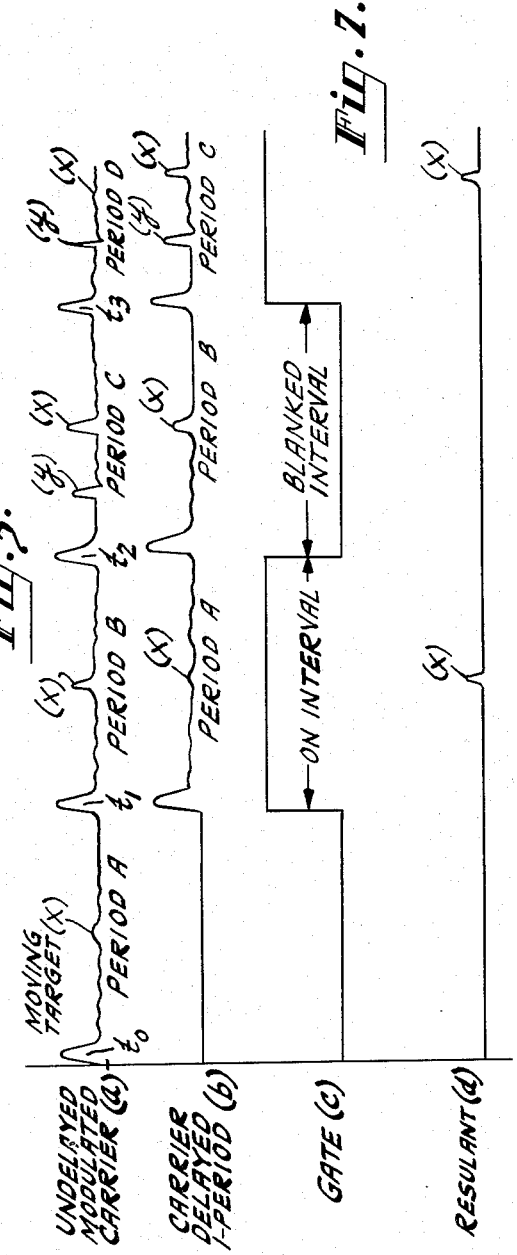
INVENTORS
JOHN R. FORD,
LESLIE E. MATSON JR.
& WALTER W. WEINSTOCK
BY
ATTORNEY

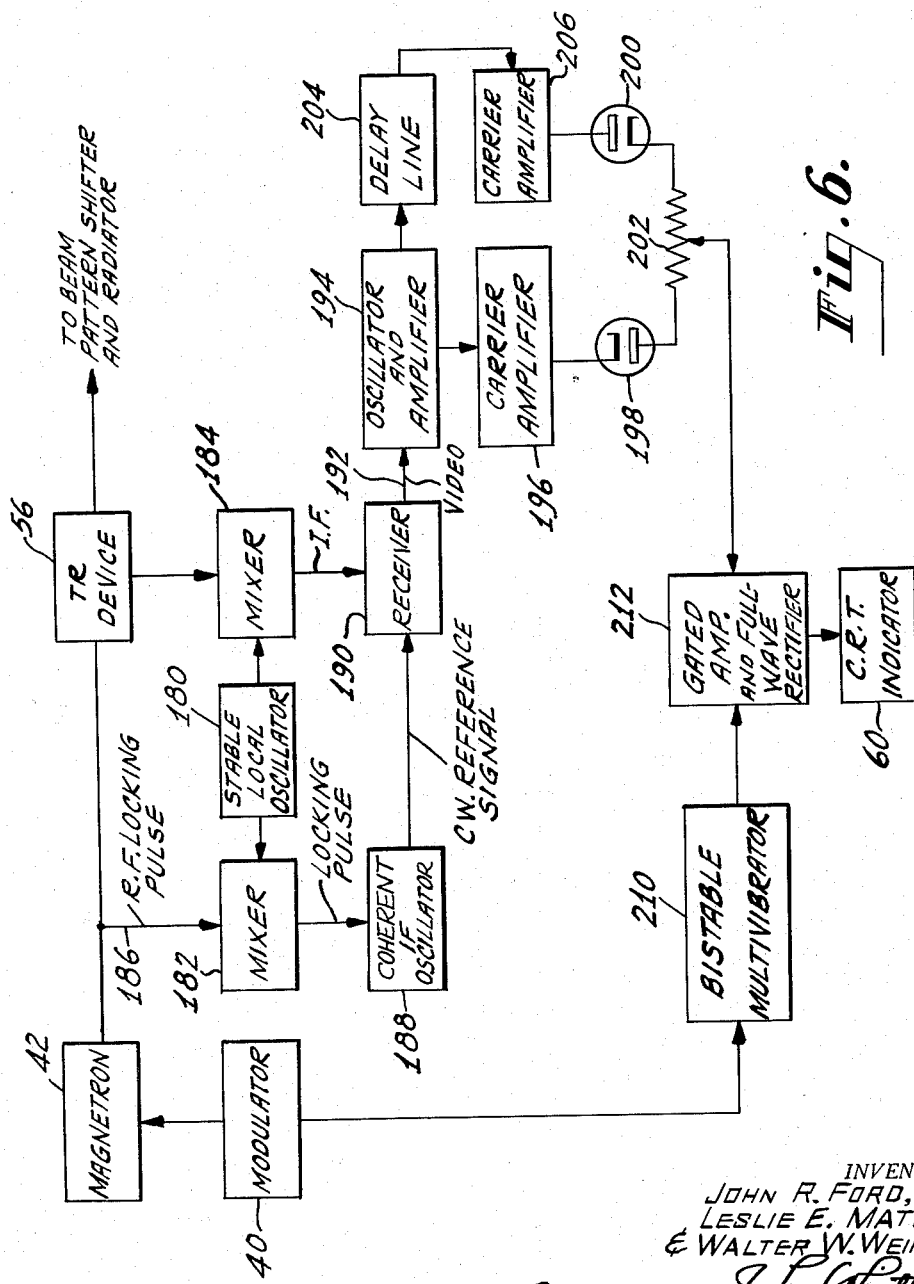

United States Patent Office 2,998,599
Patented Aug. 29, 1961

2,998,599
MOVING TARGET INDICATION
Leslie E. Matson, Jr., Collingswood, N.J., and Walter W. Weinstock, Philadelphia, and John R. Ford, Narberth, Pa., assignors to Radio Corporation of America, a corporation of Delaware
Filed Mar. 14, 1956, Ser. No. 571,569
4 Claims. (Cl. 343—7.7)

The present invention relates to an improved moving target indication (MTI) radar system.

The object of moving target indication (MTI) is to present object-returned echoes in such way that moving targets are indicated and stationary targets are not. In one such system ("line-by-line" comparison type), echoes received during one transmission-reception interval are compared in phase or amplitude with echoes received during the next transmission-reception interval. In theory, the echoes returned from fixed targets remain of substantially the same amplitude from pulse-to-pulse, whereas, due to the Doppler effect, the echoes returned from moving targets change in amplitude and phase from pulse-to-pulse. Therefore, when compared line-by-line, echoes from fixed targets cancel, whereas those from moving targets do not and may be indicated.

In a scanning radar, however, the problem is not so simple. In such systems even echoes from fixed targets are amplitude modulated. This is due to the motion of the beam as it scans through the fixed object. Accordingly, MTI circuits of the line-by-line type progressively discriminate less against fixed targets as the speed of scan increases and/or the beam width decreases.

The object of this invention is to provide an MTI radar system which substantially overcomes the above problem.

According to the invention, the radar system scans through the same sector in space on two succeeding range sweeps. The center position of the sector is then advanced in a given direction in the plane of the sector. The system then scans through the sector (which is now advanced in position) on the two succeeding range sweeps. The sector is thus progressively advanced until the entire area of interest is covered. The object-returned echoes received during the first of a pair of range sweeps are then compared with the object-returned echoes received during the second of a pair of sweeps. The fixed object-returned echoes received during the first of a pair of sweeps are of the same amplitude as the fixed object-returned echoes received during the next of a pair of sweeps so that when such echoes are compared (subtracted from one another) they cancel. On the other hand, moving object-returned echoes vary in amplitude from sweep to sweep even though the sweeps are through exactly the same sector in space. Thus, such echoes are detected and indicated.

The scanning motion above described is accomplished by superimposing on the conventional antenna search motion, which is continuous and normally at a fixed rate, a square wave or lobing type scan. Assume, for example, that the continuous searching motion is at a rate sufficiently rapid that the antenna beam moves through $\frac{1}{20}$ of a beam width in one radar pulse repetition period. The square wave motion, which is superimposed on the continuous beam scanning motion, may then be of the type which causes the beam first to move ahead of its normal position by $\frac{1}{40}$ of a beam width, to remain at this new position for a length of time sufficient to permit one radar repetition period, then to move behind the normal beam position by $\frac{1}{40}$ of a beam width, and again to remain in this last-mentioned position for one pulse repetition period.

The invention will be described in greater detail by reference to the following description taken in connection with the accompanying drawing in which:

FIGURE 3 is a schematic circuit diagram showing in greater detail a portion of the circuit shown in FIGURE 2;

Figure 1:
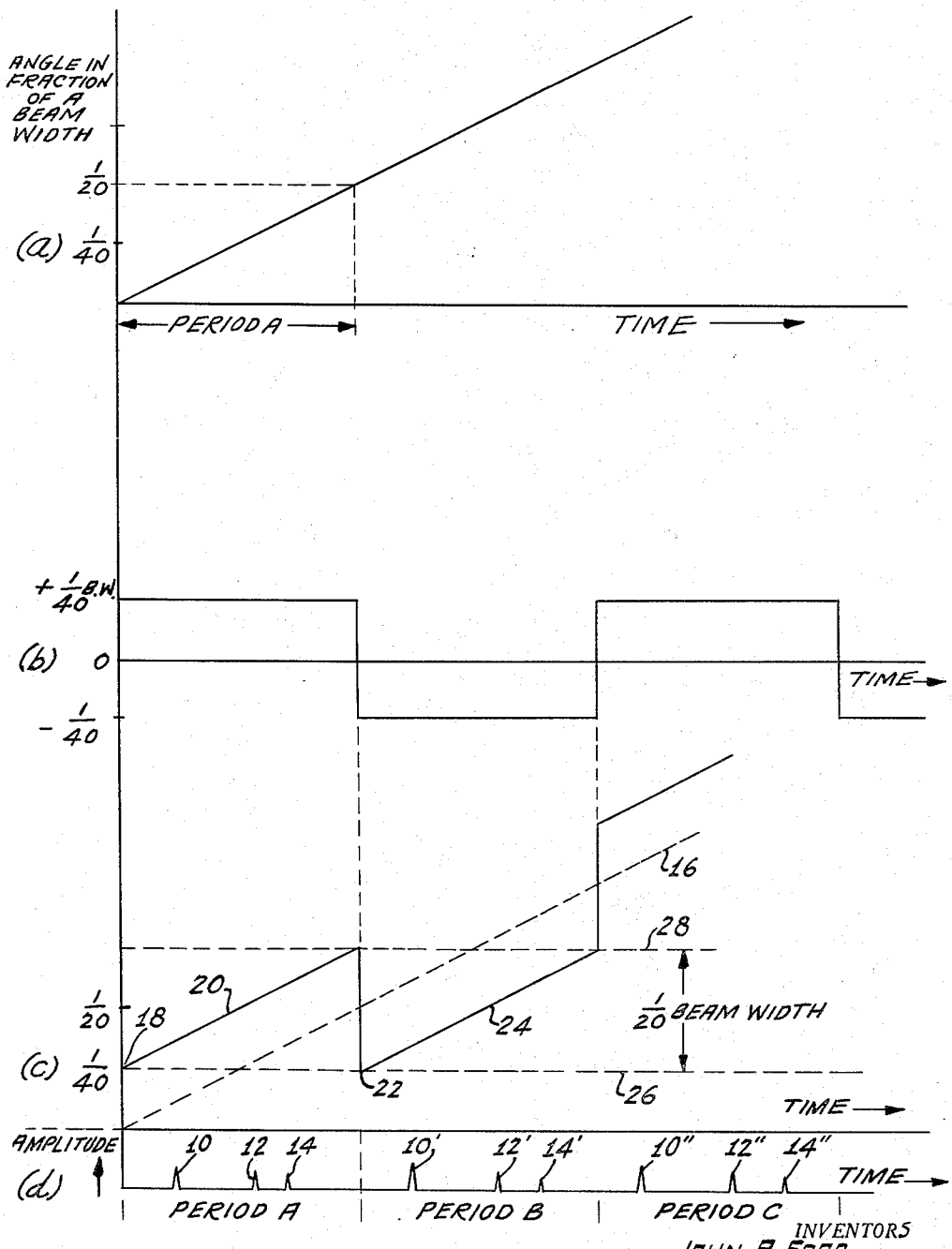
FIGURE 1 is a drawing of various waveforms useful in explaining certain features of the present invention.
Figure 2:
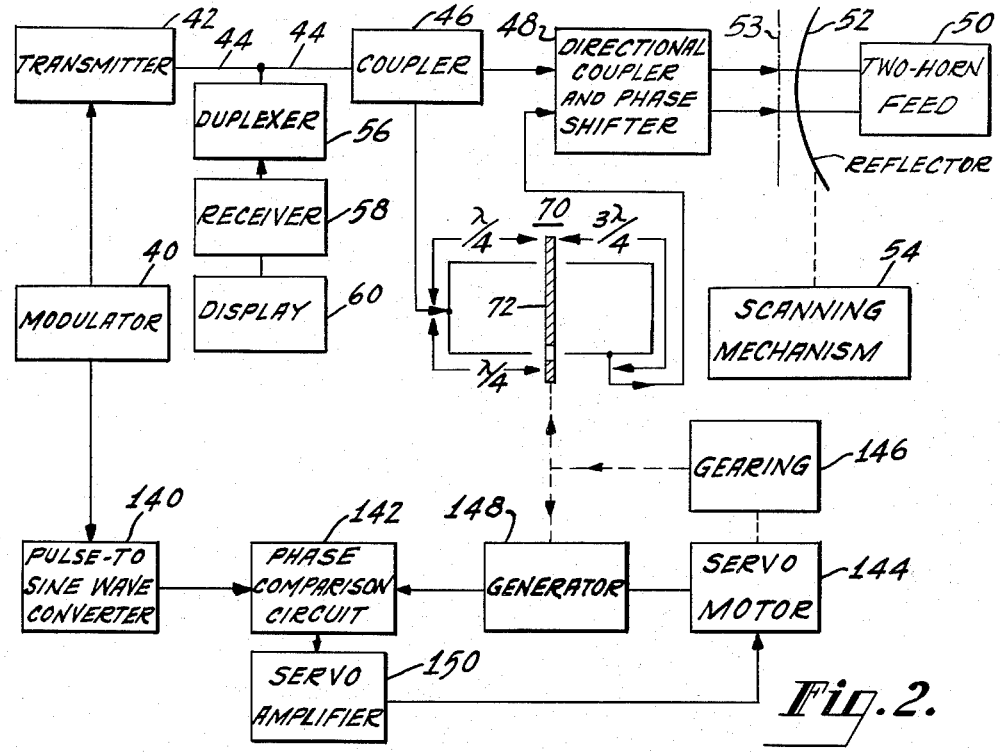
FIGURE 2 is a block circuit diagram of a form of the present invention.

FIGURES 4a–c are diagrams showing in greater detail one of the structures shown in FIGURES 2 and 3;

FIGURE 4d is a time scale which is useful in connection with the explanation of FIGURES 4a–c;

FIGURES 5a–c are a series of radiation patterns of the two-horn feed of FIGURES 2 and 3;

FIGURE 6 is a circuit diagram, mostly in block form and partially in schematic form, of an MTI receiver suitable for use in the arrangement of FIGURE 1; and FIGURE 7 is a series of waveforms to explain the line-by-line cancellation technique employed in the present invention.

Referring to FIGURE 1d, during each radar pulse repetition period, the radar system radiates pulse 10 into space and receives object-returned echoes 12 and 14. The radiating and receiving beams are highly directive.

FIGURE 1a is a plot of the normal scanning motion of the directive beam, which motion is continuous and at a fixed rate. As can be seen from a comparison of FIGURES 1a and 1d, the beam (radiating and receiving) rotates through an angle of about $\frac{1}{20}$ of a beam width during each period. As already mentioned, due to the movement of the beam as it scans past a fixed target, the echoes from fixed objects will appear to be amplitude modulated and this is highly undesirable.

This invention proposes superimposing on the scan of FIGURE 1a a square wave scan such as shown in FIGURE 1b. The resultant scanning motion is shown in FIGURE 1c. The beam first moves ahead of its normal position (shown by dashed line 16) to a new position 18, $\frac{1}{40}$ of a beam width ahead of its normal position. It then remains at the new position for one entire period A, as indicated by solid line 20. The beam is then moved in a direction opposite to the normal scanning direction $\frac{1}{20}$ of a beam width so that its new position 22 is $\frac{1}{40}$ of a beam width behind its normal position. It remains in position 24 for the next period B. The result of this type of movement is that the antenna beam scans through precisely the same sector in space during two succeeding transmission-reception periods. This can clearly be seen in FIGURE 1c where it is shown that during period A the antenna scans a sector extending from dashed line 26 to dashed line 28 and during period B the beam also scans the same sector, that is, from dashed line 26 to dashed line 28.

The result of the above type of scanning motion is not to remove entirely the amplitude modulation from fixed object-returned echoes. However, the amplitude of such echoes during one period (A) is exactly duplicated during the next period (B). As the echo amplitudes are the same during periods A and B, the echoes will cancel when subtracted from one another.

A radar system employing the principles above-described is shown in FIGURE 2. Modulator 40 triggers transmitter 42 and the latter applies carrier-frequency pulses to line 44. The transmitter pulses pass through coupler 46 and directional coupler and phase shifter 48 to a two-horn feed 50. The three last-mentioned stages will be described in greater detail later. The energy emitted from the two-horn feed 50 is normally employed to illuminate a reflector such as parabaloidal dish 52.

The reflector is normally continuously rotated about an axis, such as axis 53, by a scanning mechanism 54, which may comprise an electric motor or the like.

Object-returned echoes received by the antenna pass through stages 48 and 46 and through the duplexer 56 to receiver 58. The duplexer may comprise a TR and anti-TR device and its function is to prevent high power signals such as those emitted by the transmitter by passing to the receiver and to permit echoes to be passed to the receiver. The echoes may be displayed on display device 60 which may comprise a plan-position type (P.P.I) cathode-ray indicator or similar radar display.

The means for scanning the beam in square wave fashion (i.e., the lobing mechanism) comprises a waveguide structure 70 and a rotating disc 72. These, as well as coupler stage 46 and stages 48 and 50, are shown in greater detail in FIGURE 3 and 4a–c, to which the reader is now referred. Line 44, to which energy from the transmitter is applied, comprises a waveguide 44. The line leads directly to the sum channel 80 of a simultaneous lobing coupler type of two-horn feed 82. This feed comprises sum channel 80 and error channel 84 and the two are coupled together by a single elongated slot 86. The slot is so designed that approximately 50% of the energy in sum channel 80 passes into error channel 84 and vice versa. The characteristics of the coupler are such that energy passing through the slot is changed in phase $+90°$. All such energy is propagated to the right (as viewed on the drawing) and none passes back down the error channel to the left. A phase shifter such as a slab of dielectric material 88 is located in the sum channel beyond the slot 86 and functions to shift the phase of the energy in the sum channel $+90°$. If the initial phase $\phi$, of the energy in the sum channel is $0°$, then as it passes through the slots into the error channel it will be shifted in phase $+90°$ and as it passes through the phase shifter 88, it will be shifted in phase $+90°$. If it is assumed that both paths, that is, the one from the input end of the sum channel to the horn end 90 of the sum channel and the one from the input end of the sum channel to the horn end 92 of the error channel are of the same length, the two waves emitted from the horn 90 and 92 will be in phase. The resultant pattern will be as shown by the polar form illustration 94 of FIGURE 5c or the rectangular coordinate illustrations 96 of FIGURES 5a and b.

A portion of the energy in waveguide 44 (FIGURE 3) is coupled by means of a loop 98, length of coaxial cable 100, and loop 101 into a second waveguide 102. In practice, only a small fraction of the energy (depending upon the amount of beam shift required) is coupled to the second waveguide.

Waveguide 102 leads to a pair of waveguide sections 104 and 106, each ¼ wave length long at the operating frequency. The means for coupling waveguides 104 and 106 to waveguide 102 may comprise a magic T coupler 103, the fourth arm 103a of which includes a lossy load 103b. Disc 72 is formed with a pair of arc shaped slots 108 and 110 near opposite edges of the disc. These are shown more clearly in FIGURES 4a–c as are the relative positions of waveguide sections 104 and 106. In one position of disc 72, one of the slots is aligned with the open end of waveguide 106, whereas the open end of waveguide 104 is effectively closed by the disc. In another position of the disc, one of the slots is aligned with the open end of waveguide 104, whereas the open end of waveguide 106 is effectively closed by the disc. If sections 104 and 106 are each ¼ wave length long, when one of the sections is closed, the input end of that section looks like an open circuit, whereby all of the energy from waveguide 102 passes into the other waveguide section.

Waveguide section 112, which is ¾ of a wave length long, is aligned with waveguide section 106 and waveguide section 114, which is ¼ wave length long, is aligned with waveguide section 104. When a slot in disc 72 is aligned with the free end of waveguide 106, energy from waveguide 102 passes through a first path including waveguide 106 and waveguide 112 to error channel 84; when a slot in disc 72 is aligned with the free end of waveguide section 104, energy from waveguide 102 passes through a second path including waveguide 104 and waveguide 114 to the error channel. The first of the above paths is ½ wave length longer than the second path. The total path lengths from loop 98 to the error channel are so arranged that energy at the input end of the error channel either leads or lags the energy at the input end of the sum channel by $90°$.

As in the case of the sum channel, energy from the error channel is divided in half by directional coupler 82, one half passing through the slot 86 into the sum channel to horn 90, and the other half passing down the error channel to the horn 92. When the energy passes through the slot, it is shifted $+90°$ and it is shifted another $90°$ by phase shifter 88. The total phase shift introduced therefore as the energy passes from the error channel through the slots and through the phase shifter 88 is $180°$ (disregarding the phase shift introduced by the waveguide itself which is the same for both channels). Accordingly, energy emitted from horn 90 will be $180°$ out of phase with energy emitted from horn 92 and the resultant pattern will be double lobe as shown by dashed lines 116 in FIGURE 5c.

It will be remembered that the energy at the input ends of the sum and error channels 80 and 84 are plus or minus $90°$ out of phase. When the phase $\phi_2$ is $+90°$, then the radiated output of horn 92 due to the input to the error channel will be in phase with the radiated output of horn 92 due to the input of the sum channel. On the other hand, under the same conditions, the output at horn 90 due to the input to the error channel will be $180°$ out of phase with the output of horn 90 due to the input to the sum channel. The result will be beam reinforcement at horn 92 and beam cancellation at horn 90. This can be clearly seen in FIGURE 5a as can the resultant shift in the main pattern 120 to the left. If the same analysis is gone through for the case where the phase of the input wave to the error channel is $-90°$ with respect to the phase of the input wave, to the sum channel, it will be seen that the resultant wave 120 will be shifted to the right as shown in FIGURE 5b. This is precisely the type of beam pattern shift desired, that is, a shift in a square wave manner.

In FIGURES 5a and 5b, for the sake of drawing simplicity, the horn outputs due to the error channel input are shown as being of the same amplitude of the horn outputs due to the sum channel input. This, of course, is inaccurate as only a small fraction of the power applied to the sum channel is applied to the error channel. Thus, for the illustration to be entirely accurate, patterns 122 should be a small fraction of the size if patterns 96. As already mentioned, the amount of input power to the error channel determines the amount of beam shift, and in the present instance the shift required is only a small fraction of a beamwidth.

FIGURES 4a–c illustrate, in brief, the phasing of disc 72 with respect to the radar pulse repetition periods. At time $t=0$, the front end of a slot 110 is aligned with waveguide 106. The disc is continuously rotating in a clockwise direction. By the end of a period of time $t=t_1$, the slot has moved relative to waveguide 106, however, the back portion of the slot is still aligned with the waveguide. During the time $t_1$ to $t_2$, the disc continues to rotate. At time $t_2$, the beginning of a new period B, waveguide 106 is completely blocked by the disc, however, slot 108 has moved to a position such that its front end is aligned with waveguide 104.

From the above discussion, it will be appreciated that the rotation of the disc must be synchronized with the radar pulse repetition period. One means for doing this is illustrated in FIGURE 2. Pulses from modulator 40 are converted by stage 140 to a sine wave. A number of circuits are available for performing this function and since these are well known to those skilled in the art, they need not be discussed here. The sine wave is applied to one of the input circuits of phase comparison circuit 142. Servo motor 144 drives the disc 72 either directly or through gearing 146. Sine wave generator 148 is driven at the same speed as the disc and its output signal is applied to the second input circuit to the phase comparison circuit 142. Stages 140 and 148 are so adjusted that when the disc rotational period is synchronous with the pulse repetition period (that is, the two sine wave inputs to the phase comparison circuit are at the same frequency) and the disc is in the correct phase with the transmitted pulse (as illustrated in FIGURES 4a–d), the output of the phase comparison circuit is 0 volts. When, due to varying ambient conditions, varying line voltages, or other changes, the sine wave output of generator 148 becomes out-of-phase with the output of generator 140, an error signal is developed which is applied to the servo amplifier 150. The sense and magnitude of the error signal are functions of the direction and extent of the departure in phase of the sine wave output of generator 148 from the sine wave output of generator 140. The servo amplifier amplifies the signal and feeds it back to the servo motor in the correct sense to return the servo motor to its correct operating speed.

A number of other means are possible for maintaining rotation disc 72 in phase with the radar period. One is to employ a central time base sine wave oscillator as the basic reference frequency for the system. The sine wave may be converted to pulses for modulating the transmitter. The sine wave is also fed directly to phase comparison circuit 142, whereby stage 140 may be eliminated.

Figure 2A:
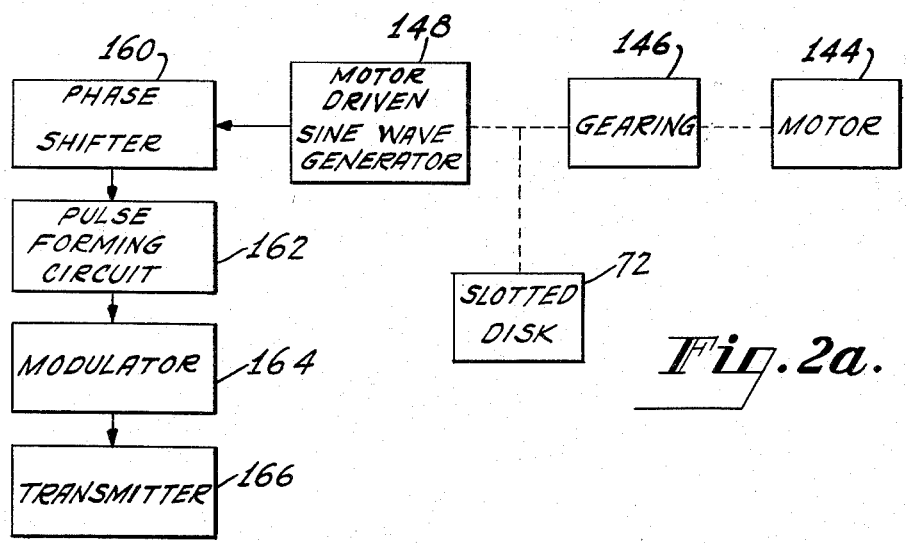
FIGURE 2a is a block circuit diagram showing a portion of the circuit of FIGURE 2 in modified form.

Still another arrangement for maintaining synchronism is shown in FIGURE 2a. Here the motor driven sine wave generator acts as the central time base of the system. Its output is applied through a phase shifter 160 to a pulse forming circuit 162. The output pulses of stage 162 are applied through modulator 164 to the transmitter 166. Adjustment of phase shifter 160 adjusts the relative phase of the radar transmission reception periods with respect to that of the rotating disc.

In another form of the invention block 148 (FIGURE 2a) may be a motor driven pulse generator. The phase shifter may then merely be a means, such as a set screw, for adjusting the rotational position of the disc on the shaft which drives it. In this embodiment, blocks 160 and 162 may be eliminated.

The radar receiver employed in the present system is conventional except for two stages. The receiver is shown in FIGURE 6, and the mode of its operation, in general, is explained in detail in chapter 16, volume 1, of the Radiation Laboratory Series. The system employs stable local oscillator 180 commonly termed "stalo" which supplies its output to two mixers 182 and 184. A portion of the signal from transmitter 42, shown here as a magnetron, is applied via lead 186 to mixer 182. The starting phase of the output signal of mixer 182 is therefore made coherent with that of the magnetron signal. The intermediate frequency pulse output of the mixer 182, which is commonly known as a "locking pulse," is applied to a second, continuous-wave oscillator 188, known as a coherent IF oscillator or more simply as a "coho." The output of this oscillator is a continuous wave reference signal which starts coherent with the magnetron pulse. Received echoes pass through duplexer 56 (shown here as a so-called "transmit-receive" device) and mixer 184 to receiver 190. The receiver mixes the continuous wave reference signal from the coho oscillator 188 with the intermediate-frequency pulses derived from echoes to obtain a resultant video signal at lead 192. The video signal is employed to amplitude modulate an oscillator in stage 194. The resultant amplitude-modulated signal is applied through an amplifier in stage 194 and carrier amplifier 196 to a subtraction circuit. The latter consists of a pair of oppositely connected diodes 198 and 200, and a potentiometer 202 connecting the anode of one diode to the cathode of another diode. The amplitude modulated output of oscillator 194 is also applied via an amplifier to delay line 204 and carrier-wave amplifier 206. The delay line delays signals one radar pulse repetition period. The arm of potentiometer 202 of the subtraction circuit is so adjusted that the fixed object-returned echoes passing through the delay line to the subtraction circuit cancel those applied directly to the subtraction circuit.

In the system of the present invention, the pulses received during one scan through a sector must be compared with those received during the second scan during the same sector. Thus, referring to FIGURES 1c and d, echoes received during period A must be compared with those received during period B. By the same token, echoes received during two successive scans through different sectors in space must not be compared. Thus, again referring to FIGURES 1c and d, echoes received during a period B must not be compared with those received during period C. The reason is that echoes received during periods A and B from fixed targets are the same amplitude and therefore will cancel, whereas the same is not necessarily true for echoes received from fixed targets during periods B and C.

The circuit which permits the type of operation described in the immediately preceding paragraph is shown in FIGURE 6. It consists of a count-down circuit, shown here as bistable multivibrator 210, connected to modulator 40. Its output is a square wave having ½ the repetition frequency of the modulator pulses. This square wave is applied to gated amplifier 212 and serves to drive the amplifier well beyond cut-off during alternate reception periods. The output of the amplifier is applied to indicator 60. If the indicator is of the PPI type, the pulses will be applied to intensity modulate the beam of the indicator.

FIGURE 7 shows a series of waveforms which may help the reader understand how the circuit of FIGURE 6 operates. The pulses labelled x are from a moving target and the amplitude of these pulses varies from pulse-to-pulse. All of the remaining echoes during periods A and B are returned from fixed targets and accordingly are of the same amplitude during periods A and B. Pulse y is also from a fixed target and is larger in period C than in period B because the beam is more nearly centered on the target during period C than during period B. Since the beam sweeps through the same sectors during periods C and D, pulses y are of the same amplitude during periods C and D. The square wave output of stage 210 (FIGURE 6) is shown in FIGURE 7c. It permits amplifier 212 to conduct during the time of comparison of periods A and B, whereby a resultant signal x is obtained (see FIGURE 7d). If period B were compared with period C, the result would be two pulses, one due to fixed target y and the other due to moving target x. Thus, it would appear as if it were two moving targets, whereas only one is present. Accordingly, gate amplifier 212 is blanked during the period waves B and C would normally be compared, and no indication appears on the screen of the indicator. When periods C and D are compared, pulses y cancel.

The signal applied from potentiometer 202 (FIGURE 6) to amplifier 212 is bipolar when the signal is from a moving target. For this reason full wave rectifiers are included between the indicator and the gated amplifier. For the sake of drawing simplicity, the waves of FIGURES 7a and b are shown as being unipolar.

Although in the discussion above certain specific structures are set forth for the various components of the present invention, it will be appreciated that numerous alternatives are possible. For example, the indicator described is a plan-position type indicator. Type A, type B or other similar displays may be employed instead. In the case of the P.P.I. and type B displays, the moving target echoes are applied to intensity modulate the electron beam. In types of displays such as the type A display, the moving target echo may be applied to the oscilloscope deflection means.

The phase shifter in series with one of the horns is shown in one of the figures as comprising a dielectric slab. Other equally well known phase shifters are possible. For example, the phase shifter may comprise a pair of conductive fins mounted to opposite inner walls of the waveguide or may comprise dielectric or metal posts or the like.

The coupler 100 of FIGURE 3, shown as comprising a length of coaxial line, may instead be a directional coupler similar to the one connected to the two-horn feed. The coupling slot, however, would be of relatively small size to permit only a fraction of the power in the main wave guide to reach the error channel. Alternatively, the coupler may comprise a section of waveguide so oriented with respect to the main waveguide that only a small fraction, depending on the amount of beam shifting required, of the incident power is supplied to the error channel. Other forms of the invention may include a hybrid type junction such as a double 1 hybrid, or the like.

The transmitter is shown in one of the figures as comprising a magnetron. It will be appreciated that a klystron or, at lower frequencies, a high power triode or similar device may be used instead.

Finally, the reflector of FIGURE 1 may be a parabolic cylinder, a flat reflector, a cosecant squared reflector or similar well known arrangement.

What is claimed is:

1. In a pulse-echo location system of the type providing a scannable, directive transmitting or receiving beam pattern, in combination, means for scanning said directive beam pattern through the same sector in space during a pair of succeeding pulse transmission-reception periods, said means including means for alternately advancing and retarding said beam pattern through a sector in space by an amount that is small compared with the width of said beam pattern, said advancing and retarding being done in times that are short compared to the times that said beam pattern is in its advanced position or in its retarded position, and means for continuously moving the center position of said sector in a given direction in the plane of said sector; and means for comparing the amplitudes of all echoes received during one of said periods with the amplitudes of all echoes received during the other of said periods.

2. In a radar system for distinguishing fixed from moving targets of the type including means for radiating and receiving a directive beam of electromagnetic waves, the improvement comprising, in combination, means for scanning said directive beam through a given sector in space during two succeeding transmission-reception intervals and for scanning said directive beam through another sector in space of the same size as said first sector, the center position of said other sector in space being displaced from the center position of the first sector in space by a relatively small angle during the two succeeding transmission-reception intervals; means for comparing the target-returned echoes during the first-mentioned, two succeeding transmission-reception intervals and for comparing the target-returned echoes received during the next-mentioned, two succeeding transmission-reception intervals.

3. In a pulse-echo location system of the type including means for producing a scannable, directive transmitting or receiving beam pattern, in combination, means for scanning said directive beam pattern through the same sector in space during a pair of succeeding pulse transmission-reception periods, said means including a two-horn feed, means for continuously scanning said feed, first means for continuously supplying in phase first waves at a given frequency to both of said horns, second means for supplying 180° out of phase second waves at said given frequency to the respective ones of said horns, which are in phase with said first waves at one horn and 180° out of phase with said first waves at the other of said horns, and switch means for periodically changing the horn to which the 180° out of phase second waves are applied and simultaneously changing the horn to which the in phase second waves are applied; and means for comparing the amplitudes of all echoes received during one of said periods with the amplitudes of all echoes received during the other of said periods.

4. In a pulse-echo location system as set forth in claim 3, said second waves being of substantially smaller amplitude than said first waves.

References Cited in the file of this patent

UNITED STATES PATENTS

| | | |
|---|---|---|
| 2,418,143 | Stodola | Apr. 1, 1947 |
| 2,544,715 | Muchmore | Mar. 13, 1951 |
| 2,678,440 | Watt | May 11, 1954 |
| 2,703,866 | De La Cova et al. | Mar. 8, 1955 |
| 2,710,398 | Emslie | June 7, 1955 |
| 2,757,341 | Lundstrom | July 31, 1956 |
| 2,811,715 | Baker | Oct. 29, 1957 |